US012768761B2

(12) United States Patent
Endo et al.

(10) Patent No.: US 12,768,761 B2
(45) Date of Patent: Oct. 20, 2026

(54) HYDROGEN CHARGING DEVICE AND ROTATING BENDING FATIGUE TESTING MACHINE USING SAME

(71) Applicant: Fukuoka University, Fukuoka (JP)

(72) Inventors: Masahiro Endo, Fukuoka (JP); Takashi Matsuo, Fukuoka (JP)

(73) Assignee: Fukuoka University, Fukuoka (JP)

( * ) Notice: Subject to any disclaimer, the term of this patent is extended or adjusted under 35 U.S.C. 154(b) by 319 days.

(21) Appl. No.: 18/425,179

(22) Filed: Jan. 29, 2024

(65) Prior Publication Data

US 2024/0167927 A1 May 23, 2024

Related U.S. Application Data

(63) Continuation of application No. PCT/JP2022/029164, filed on Jul. 28, 2022.

(30) Foreign Application Priority Data

Aug. 3, 2021 (JP) ................................ 2021-127546

(51) Int. Cl.

*G01N 3/38* (2006.01)
*H01M 8/04082* (2016.01)
*H01M 8/04186* (2016.01)

(52) U.S. Cl.

CPC .......... *G01N 3/38* (2013.01); *H01M 8/04186* (2013.01); *H01M 8/04201* (2013.01);

(Continued)

(58) Field of Classification Search

CPC ............ G01N 3/38; G01N 2203/0023; G01N 2203/005; G01N 2203/0073; G01N 3/20;

(Continued)

(56) References Cited

U.S. PATENT DOCUMENTS 3,586,617 A * 6/1971 Luccia .................. G01N 27/49 204/406
4,620,914 A * 11/1986 Abens ...................... C25B 1/02 205/639

(Continued)

FOREIGN PATENT DOCUMENTS

CN 104515732 A 4/2015
CN 110220809 A 9/2019

(Continued)

OTHER PUBLICATIONS

Extended European Search Report issued in European Patent Application No. 22852942.6, dated Oct. 14, 2024 (10 pages).

(Continued)

*Primary Examiner* — Freddie Kirkland, III

(74) *Attorney, Agent, or Firm* — Nakanishi IP Associates, LLC

(57) ABSTRACT

The hydrogen charging device includes an anode material that can be accommodated in a through-hole provided inside a test specimen in a state of being separated from an inner peripheral surface of the through-hole, a circulation path and a liquid pump that circulate and supply an electrolytic solution into the through-hole, and a direct-current power source that applies a minus voltage to the test specimen and a plus voltage to the anode material.

6 Claims, 7 Drawing Sheets

(52) U.S. Cl.
CPC ................ *G01N 2203/0023* (2013.01); *G01N 2203/005* (2013.01); *G01N 2203/0073* (2013.01)

(58) Field of Classification Search
CPC ......... G01N 17/006; G01N 2203/0032; G01N 2203/0242; G01N 2203/0268; G01N 17/002; H01M 8/04186; H01M 8/04201
See application file for complete search history.

(56) References Cited

U.S. PATENT DOCUMENTS

| | | | | |
|---|---|---|---|---|
| 5,405,513 | A * | 4/1995 | Lewis, II ............... | G01N 17/00 422/53 |
| 11,680,887 | B1 * | 6/2023 | Zhang ................ | G01N 15/0806 73/73 |
| 12,252,794 | B2 * | 3/2025 | Harada ..................... | C25B 9/77 |
| 2004/0253494 | A1 * | 12/2004 | Maruyama ............ | H01M 8/065 429/444 |
| 2011/0139321 | A1 * | 6/2011 | Murakami .............. | C22C 38/58 148/634 |
| 2013/0327353 | A1 * | 12/2013 | Field ......................... | B08B 7/00 134/1 |
| 2022/0307968 | A1 * | 9/2022 | Al-Janabi ............ | G01N 17/006 |

FOREIGN PATENT DOCUMENTS

| | | | | |
|---|---|---|---|---|
| JP | S58-123352 | U | 8/1983 | |
| JP | H11-183351 | A | 7/1999 | |
| JP | 2006-029977 | A | 2/2006 | |
| JP | 2006-349487 | A | 12/2006 | |
| JP | 2007-286036 | A | 11/2007 | |
| JP | 2009250679 | A * | 10/2009 | ............... G01N 3/34 |
| JP | 2011-191254 | A | 9/2011 | |
| JP | 2012-047540 | A | 3/2012 | |
| JP | 2013-124998 | A | 6/2013 | |
| JP | 2016-121947 | A | 7/2016 | |

OTHER PUBLICATIONS

Yoshimoto T et al: "An investigation into the frequency dependence upon the fatigue crack growth rate conducted by novel fatigue testing method with in-situ hydrogen-charging", Journal of Physics: Conferrence Series, vol. 843, May 1, 2017, p. 012050, XP 093208403, GB ISSN: 1742-6588, DOI: 10.1088/1742-6596/843/1/012050 * figure 1** 2.1 Testing method* (7 pages).

Akaki Y. et al: "Crack size dependency of shear-mode fatigue threshold in bearing steel subjected to continuous hydrogen charging", Procedia Structural Integrity, vol. 14 , Jan. 1, 2019, pp. 11-17, EP093208424, ISSN: 2452-3216, DOI: 10.1016/j.prostr.2019.05.003 * figure 1-3** 2.2 Continuous hydrogen-charging method* (7 pages).

International Search Report issued in PCT/JP2022/029164 mailed on Sep. 27, 2022 with English Translation (5 pages).

Written Opinion of International Searching Authority issued in PCT/JP2022/029164 mailed on Sep. 27, 2022 with English Translation (5 pages).

First Examination Report issued in Indian Patent Application No. 202417008353 dated Feb. 2, 2026, with English Translation (8 pages).

Office Action issued in Chinese Patent Application No. 202280052110.5 mailed on May 20, 2026, with English Translation (19 pages).

* cited by examiner

HYDROGEN CHARGING DEVICE AND ROTATING BENDING FATIGUE TESTING MACHINE USING SAME

TECHNICAL FIELD

The present invention relates to a device that charges hydrogen into a test specimen to evaluate hydrogen embrittlement properties of materials and a rotating bending fatigue testing machine using the same.

BACKGROUND ART

Japan is in a critical situation with a low energy self-sufficiency rate despite of its large energy consumption, and in order to resolve this situation, transformation to a decarbonized society is required. As one of the ways to realize such transformation, shifting from a carbon energy society to a hydrogen energy society is cited. In order to realize the hydrogen energy society, it is important not only to ensure hydrogen resources, but also to select materials usable in a hydrogen environment and develop new materials suitable for the hydrogen environment, and for this purpose, it is essential to establish reasonable means of investigating material strength properties.

In particular, due to the extensive testing period, it is necessary in the fatigue test, which evaluates the hydrogen embrittlement properties of a material, to continue hydrogen charging, that is, continuously supply hydrogen for exposing the material to a hydrogen environment for a long time period for performing the test.

The conventional hydrogen charging methods include the method of exposing a material to a high-pressure hydrogen gas (see Patent Literature 1, for example), or the method of immersing a material in a hydrogen charge liquid (see Patent Literatures 2 and 3, for example).

Meanwhile, concerning the fatigue testing machine for test specimens, various fatigue testing machines have been conventionally proposed, and as the one relating to the present invention, there is cited the "rotating bending testing machine" described in Patent Literature 4, for example. The "rotating bending testing machine" has a function of performing a fatigue test by applying a torsional force while applying a bending moment to the test specimen.

CITATION LIST

Patent Literature

Patent Literature 1: Japanese Patent Laid-Open No. 2006-349487
Patent Literature 2: Japanese Patent Laid-Open No. 2012-47540
Patent Literature 3: Japanese Patent Laid-Open No. 2016-121947
Patent Literature 4: Japanese Patent Laid-Open No. 2009-250679

SUMMARY OF INVENTION

Technical Problem

When using the "mechanical property testing device" described in Patent Literature 1, it is an essential requirement to supply high-pressure gas containing hydrogen stably and safely, but in order to realize this, large-scale test equipment that can reliably transport and encapsulate the high-pressure gas containing hydrogen is required, and the reality is that a huge amount of equipment cost and testing cost are expended.

Further, the "hydrogen charge method" described in each of Patent Literatures 2 and 3 has the problem that since the hydrogen charging solution contacts the test specimen surface, not only the test specimen surface can corrode, but also it becomes difficult to observe the fracture origin on the test specimen surface.

On the other hand, in the "rotating bending testing machine" described in Patent Literature 4, the test is performed by setting the test specimen after being charged with hydrogen by a predetermined hydrogen charge method, so that the hydrogen charged in the test specimen may be dissipated while the test is performed, and the properties of the test specimen may not be accurately evaluated. Such a situation tends to become more noticeable in a fatigue test with the long-term testing period.

Thus, the problem to be solved by the present invention is to provide a hydrogen charging device capable of efficiently charging hydrogen into a test specimen with a simple structure, and a rotating bending fatigue testing machine capable of appropriately evaluating hydrogen embrittlement properties of a material and rationally selecting a material usable in a hydrogen environment.

Solution to Problem

A hydrogen charging device according to the present invention includes

- a circulation path and a liquid pump that circulate and supply an electrolytic solution into a through-hole provided inside a test specimen,
- an anode material capable of being accommodated in the through-hole provided inside the test specimen, in a state of being separated from an inner peripheral surface of the through-hole, and
- a direct-current power source that applies a minus voltage to the test specimen, and a plus voltage to the anode material.

In the hydrogen charging device, at least a part of the anode material can have a spiral shape with an outside diameter smaller than an inside diameter of the through-hole.

In the hydrogen charging device, at least a part of an outer periphery of the part having the spiral shape of the anode material can be coated with a non-conductive material having liquid permeability.

In the hydrogen charging device, at least one of vibration applying means that applies vibration to the test specimen, or pulsation applying means that pulsates the electrolytic solution flowing in the through-hole can be included.

Next, a rotating bending fatigue testing device includes

- a pair of tubular shaft members coaxially disposed to face each other to rotate a test specimen in a state of respectively gripping end portions of the test specimen having a through-hole opening on both end surfaces,
- bending means that applies a bending moment to the test specimen,
- driving means that rotates the test specimen in a state where a bending moment is applied by the bending means, and
- a liquid pump and a circulation path that circulate and supply an electrolytic solution from one of the tubular shaft members to the other of the tubular shaft members via the through-hole of the test specimen gripped by the tubular shaft members.

In the rotating bending fatigue testing machine, an anode material accommodated in the through-hole of the test specimen gripped by the tubular shaft members, in a state of being separated from an inner peripheral surface of the through-hole, and a direct-current power source that applies a minus voltage to the test specimen, and a plus voltage to the anode material can be provided.

In the rotating bending fatigue testing machine, the circulation path placed in the tubular shaft members and the through-hole of the test specimen can be caused to communicate with each other by a rotating joint.

In the rotating bending fatigue testing machine, a direct current can be supplied to each of the test specimen and the anode material from the direct-current power source via a brush.

Advantageous Effects of Invention

According to the present invention, it is possible to provide a hydrogen charging device that can efficiently charge hydrogen into a test specimen with a simple structure, and a rotating bending fatigue testing machine that can appropriately evaluate hydrogen embrittlement properties of a material, and can rationally select a material usable in a hydrogen environment.

DESCRIPTION OF EMBODIMENT

Hereinafter, hydrogen charging devices 100 and 101 and rotating bending fatigue test machines 200 and 201 according to embodiments of the present invention will be described based on FIG. 1 to FIG. 7.

Figure 1:
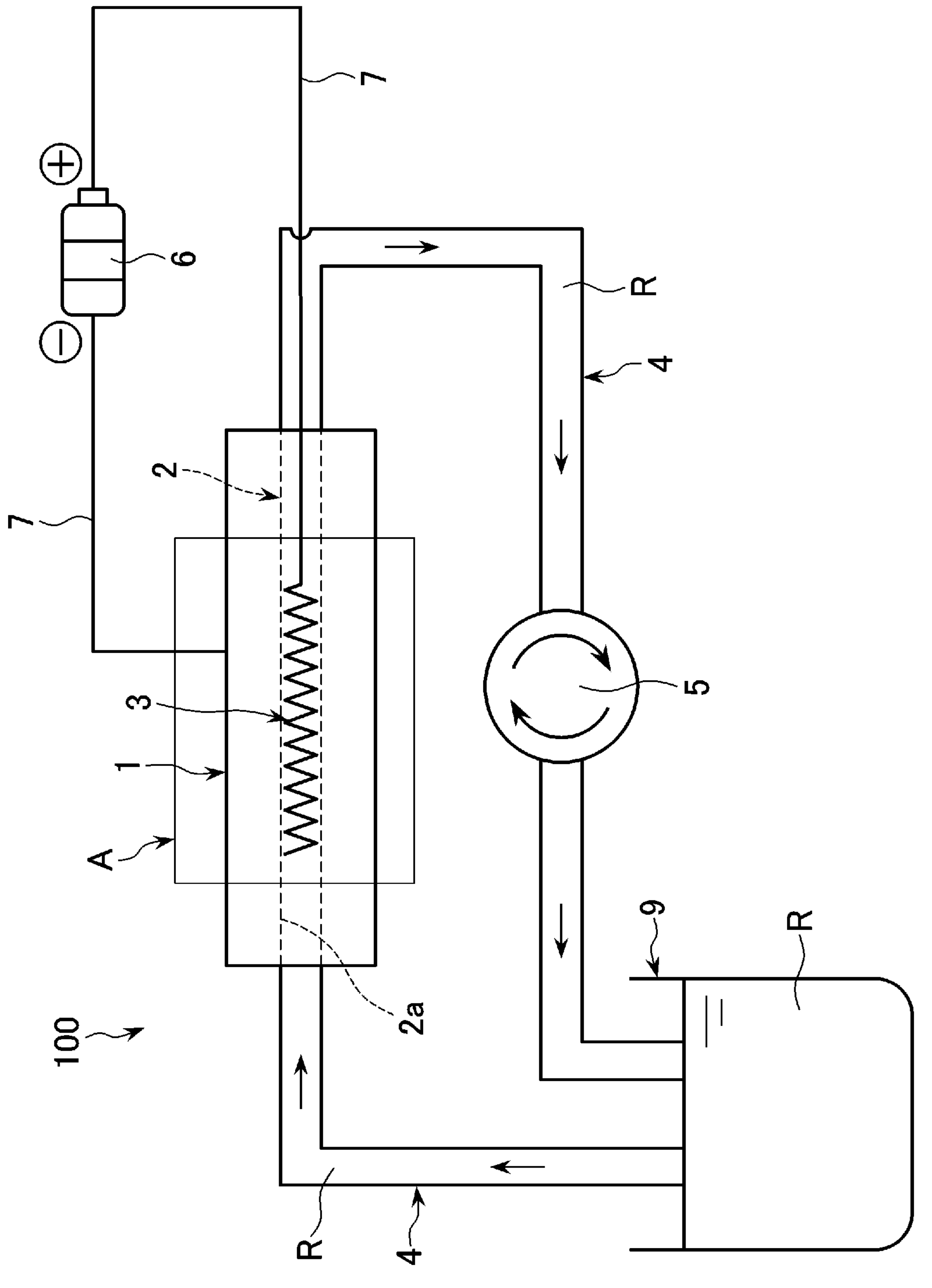
FIG. 1 is a view showing a schematic configuration of a hydrogen charging device according to an embodiment of the present invention.

First, based on FIG. 1 and FIG. 2, the hydrogen charging device 100 will be described. As shown in FIG. 1, the hydrogen charging device 100 includes an anode material 3 that can be accommodated in a through-hole 2 provided inside a test specimen 1, in a state of being separated from an inner peripheral surface 2*a* of the through-hole 2, a circulation path 4 and a liquid pump 5 that circulate and supply an electrolytic solution R into the through-hole 2, and a direct-current power source 6 that applies a minus voltage to the test specimen 1 and a plus voltage to the anode material 3. The circulation path 4 is formed of a flexible tube, and the specimen 1 and the anode material 3, and the direct-current power source 6 are connected by coated copper wires 7 respectively.

As shown in FIG. 1, a relay tank 9 that temporarily stores the electrolytic solution R circulating in the circulation path 4 by the liquid pump 5 is disposed in the middle of the circulation path 4. As the electrolytic solution R, a dilute aqueous sodium hydroxide solution is used, but the electrolytic solution is not limited to this.

Figure 2:
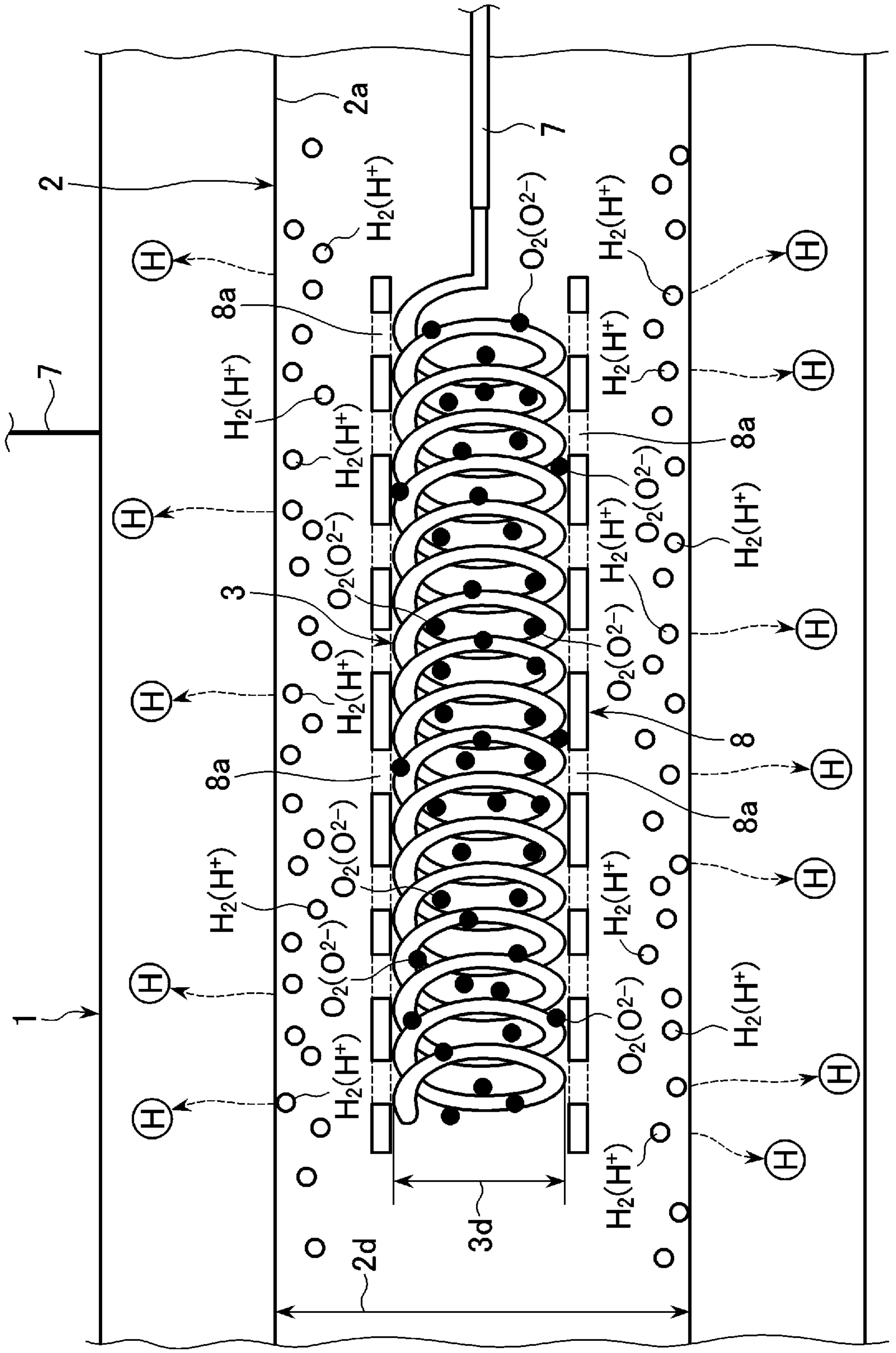
FIG. 2 is a partially omitted enlarged sectional view of a region shown by an arrow A in FIG. 1.

As shown in FIG. 2, the anode material 3 is formed of a platinum wire material, but is not limited to this, and therefore can also be formed of a conductive wire material with a surface plated with platinum. The anode material 3 has a spiral shape entirely to increase a surface area thereof, and an outside diameter 3*d* of a spiral shape portion is smaller than an inside diameter 2*d* of the through-hole 2. A shape of the anode material 3 is not limited to the spiral shape, and a bar (not illustrated) or the like having a shape other than the spiral shape and made for the purpose of increasing the surface area can also be used.

An outer periphery of a portion having the spiral shape of the anode material 3 is coated with a non-conductive material 8 having corrosion resistance and liquid permeability. The non-conductive material 8 is a coated tube of a synthetic resin having a large number of liquid passage holes 8*a*, but the non-conductive material 8 is not limited to this, and therefore, reticulated coated tube (not illustrated) or the like having corrosion resistance and liquid permeability can also be used.

In the hydrogen charging device 100 shown in FIG. 1, when a current is passed by applying a minus voltage to the test specimen 1 and a plus voltage to the anode material 3 by the direct-current power source 6 while circulating and supplying the electrolytic solution R into the through-hole 2 of the test specimen 1 via the circulation path 4 by the liquid pump 5, oxygen ions $O^{2-}$ are attracted into the electrolytic solution R in a vicinity of the anode material 3, and hydrogen ions $H^+$ are attracted into the electrolytic solution R in a vicinity of the inner peripheral surface 2*a* of the through-hole 2 of the test specimen 1, and the hydrogen ions $H^+$ or hydrogen gas $H_2$ receive electrons and enter the test specimen 1 as hydrogen atoms H from the inner peripheral surface 2*a* of the through-hole 2, whereby the test specimen 1 is charged with hydrogen. A temperature and pH of the electrolytic solution R and the voltage and current applied by the direct-current power source 6 at this time can be controlled by control means (not illustrated).

Since the hydrogen charging device 100 performs hydrogen charge while circulating and supplying the electrolytic solution R into the through-hole 2 of the test specimen 1, hydrogen can be efficiently charged into the test specimen 1. In addition, since the hydrogen charging device 100 can be formed of the anode material 3, the electrolytic solution R, the circulation path 4, the liquid pump 5, the direct-current power source 6, the coated copper wire 7 and the like, and does not require a high-pressure gas container, a high-pressure gas conveyance path or the like, the structure is simple and inexpensive.

On the other hand, if vibration applying means (not illustrated) that applies vibration to the test specimen 1, or pulsation applying means (not illustrated) that pulsates the electrolytic solution R flowing in the through-hole 2 is provided in the hydrogen charging device 100, bubbles of hydrogen $H_2$ and oxygen $O_2$ that are generated in the electrolytic solution R in the through-hole 2 of the test specimen 1 can be discharged to outside the through-hole 2, and therefore, it is possible to prevent the bubbles of hydrogen $H_2$ and oxygen $O_2$ from staying on the inner peripheral surface 2a of the through-hole 2 and in the vicinity of the anode material 3 and inhibiting the electrochemical reaction.

Next, based on FIG. 3 to FIG. 5, the rotating bending fatigue test machine 200 using the hydrogen charging device 100 shown in FIG. 1 will be described. Note that in the portions configuring the rotating bending fatigue test machine 200 shown in FIG. 3 to FIG. 5, portions that are common to the portions configuring the hydrogen charging device 100 shown in FIG. 1 are assigned with the same reference signs as the reference signs in FIG. 1 and FIG. 2, and explanation thereof may be omitted. Further, in FIG. 3 to FIG. 5, there are some portions where cross-hatching is not filled in order to ensure visibility of leader lines of the reference signs.

Figure 3:
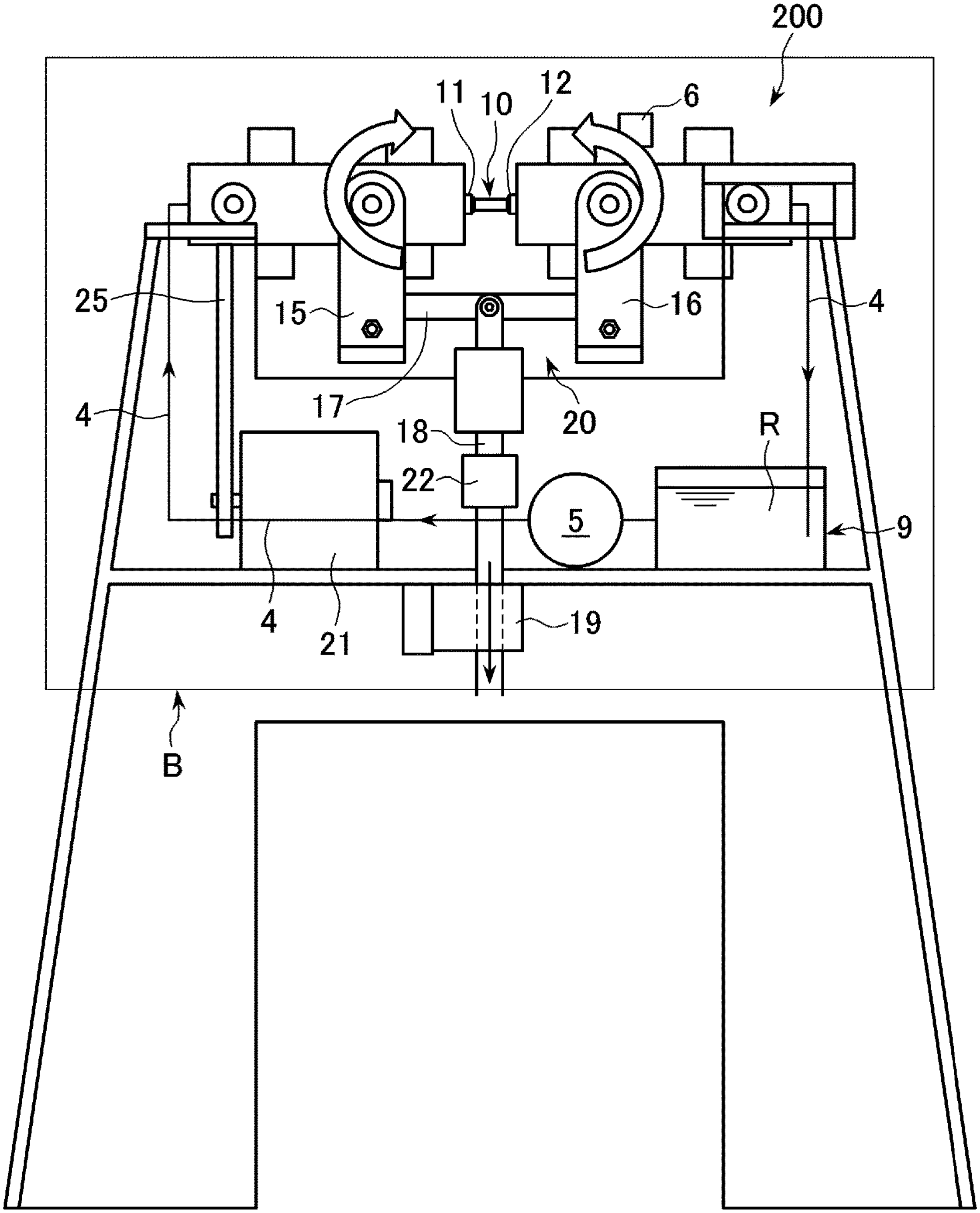
FIG. 3 is a partially omitted front view showing a rotating bending fatigue testing machine according to the embodiment of the present invention.
Figure 4:
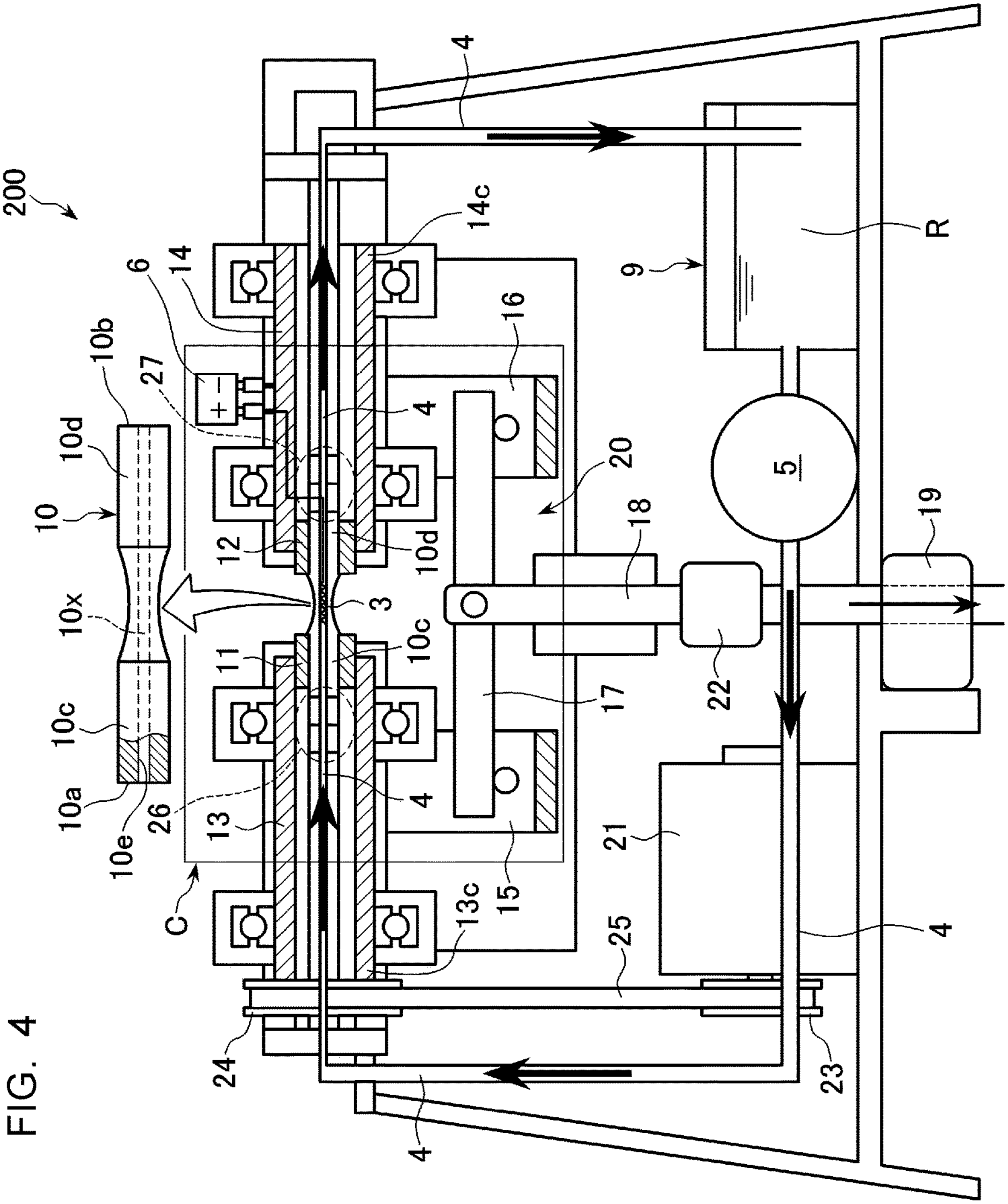
FIG. 4 is a partially omitted vertical sectional view of a region shown by an arrow B in FIG. 3.

As shown in FIG. 3 and FIG. 4, the rotating bending fatigue testing machine 200 includes a pair of tubular shaft members 13 and 14 coaxially disposed to face each other to grip and rotate end portions 10c and 10d of the test specimen 10 having a through-hole 10x opening on both end surfaces 10a and 10b by chucks 11 and 12 respectively, bending means 20 that applies a bending moment to the test specimen 10, a motor 21 that is driving means that rotates the test specimen 10, the liquid pump 5 and the circulation path 4, and the direct-current power source 6.

The bending means 20 includes hanging members 15 and 16 that transmit a pulling-down force to the tubular shaft members 13 and 14 respectively, a horizontal connecting member 17 that connects lower side portions of the hanging members 15 and 16, a vertical connecting member 18 that transmits a pulling-down force to the horizontal connecting member 17, and a pulling-down mechanism 19 that applies a pulling-down force to the vertical connecting member 18. The pulling-down mechanism 19 has a function of forcefully applying a pulling-down load to the vertical connecting member 18, and includes a load gauge 22 that monitors the pulling-down load applied to the vertical connecting member 18.

A rotational force of the motor 21 is transmitted to the tubular shaft member 13 via pulleys 23 and 24 and a belt 25, and the tubular shaft member 14 rotates with the test specimen 10. Thereby, the test specimen 10 rotates in a state in which a bending moment is applied to the test specimen 10 by the bending means 20.

In the through-hole 10x of the test specimen 10 gripped by the chucks 11 and 12 of the tubular shaft members 13 and 14, the anode material 3 is accommodated in a state of being separated from an inner peripheral surface 10e of the through-hole 10x, and the electrolytic solution R can be circulated and supplied from an inside of the one tubular shaft member 13 into the other tubular shaft member 14 via the through-hole 10x of the test specimen 10 by the liquid pump 5 and the circulation path 4. A shape, a structure and the like of the anode material 3 accommodated in the through-hole 10x are similar to the shapes, structures and the like of the anode material 3 and the non-conductive material 8 accommodated in the through-hole 2 shown in FIG. 2.

Note that if a hollow motor (not illustrated) is used instead of the motor 21, and the hollow motor is directly connected to the tubular shaft member 13, it is also possible to circulate and supply the electrolytic solution R via the inside of the tubular shaft members 13 and 14 while rotating the tubular shaft members 13 and 14 without aid of the pulleys 23 and 24 and the belt 25.

Figure 5:
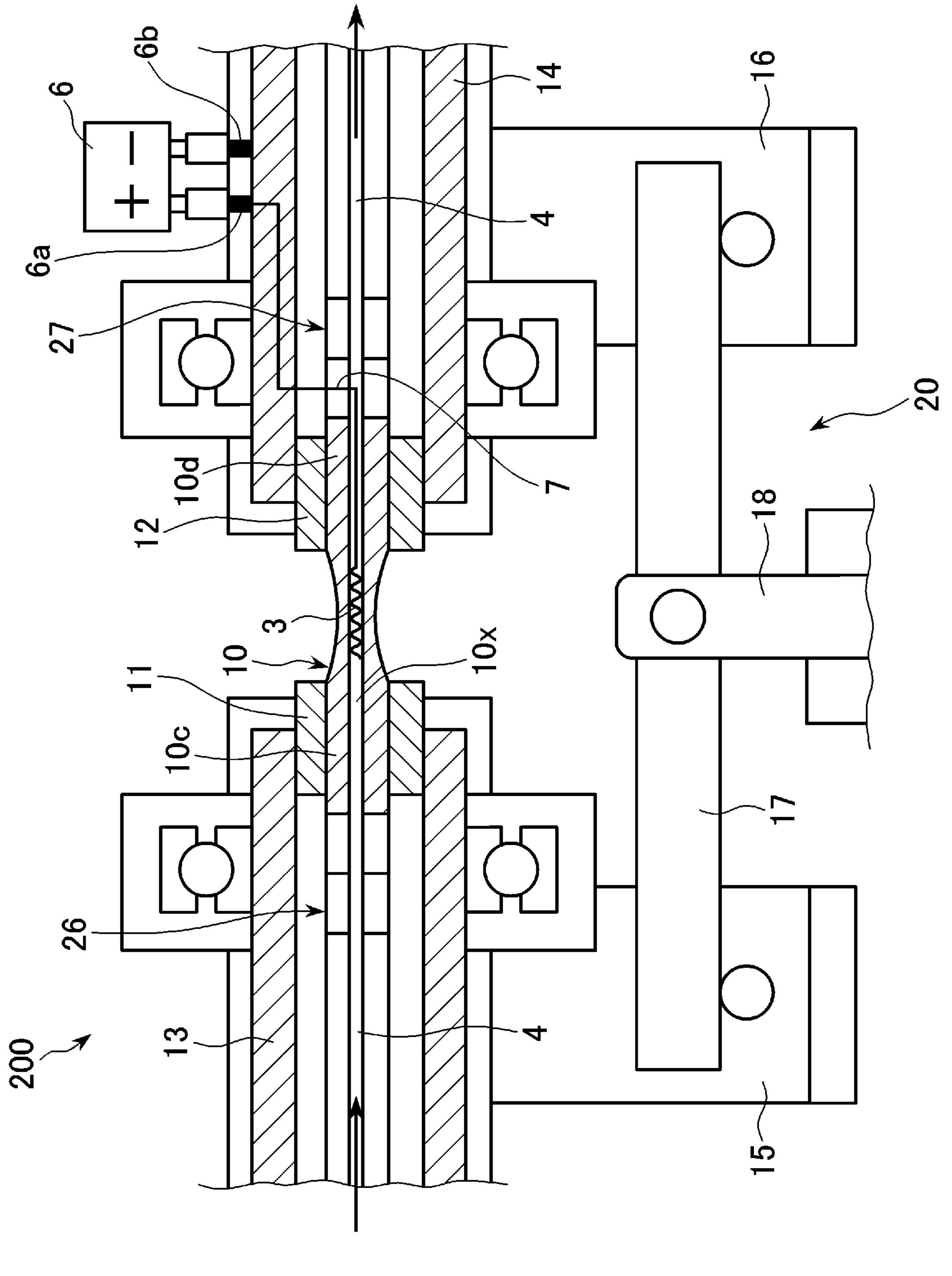
FIG. 5 is a partially omitted enlarged view of a region shown by an arrow C in FIG. 4.

As shown in FIG. 4 and FIG. 5, the circulation path 4 placed in the one tubular shaft member 13 and an opening on an end portion 10c side of the through-hole 10x of the test specimen 10 are caused to communicate with each other by a rotary joint 26, and the circulation path 4 placed in the other tubular shaft member 14 and an opening on an end portion 10d side of the through-hole 10x of the test specimen 10 are caused to communicate with each other by a rotary joint 27. The rotary joints 26 and 27 are also referred to as rotating bearings and can cause the stationary circulation path 4 and the through-hole 10x of the rotating test specimen 10 to communicate with each other in a liquid-tight manner. Installation positions of the rotary joints 26 and 27 are not limited to the end portions 10c and 10d of the test specimen 10, but may be any places as long as they are in the middle of the insides of the tubular shaft members 13 and 14, and therefore, the rotary joints 26 and 27 may also be installed, for example, in end portions 13c and 14c (see FIG. 4) of the tubular shaft members 13 and 14.

The direct-current power source 6 can apply a minus voltage to the test specimen 10, and a plus voltage to the anode material 3, and a direct current is supplied to the anode material 3 and the test specimen 10 via brushes 6a and 6b respectively.

In the rotating bending fatigue testing machine 200 shown in FIG. 3 to FIG. 5, it is possible to perform the rotating bending fatigue test of the test specimen 10 while efficiently charging hydrogen to the test specimen 10, by applying a minus voltage to the test specimen 10 and a plus voltage to the anode material 3 by the direct-current power source 6 while circulating and supplying the electrolytic solution R into the through-hole 10x of the test specimen 10 by operating the liquid pump 5, and rotating the test specimen 10 by the motor 21 in the state where a bending moment is applied to the test specimen 10 by the pulling-down mechanism 19.

Accordingly, it is possible to appropriately evaluate the hydrogen embrittlement properties of the material (test specimen 10) and rationally select the material usable in the hydrogen environment, by performing the rotating bending fatigue test of the test specimen 10 by using the rotating bending fatigue testing machine 200. Further, the rotating bending fatigue testing machine 200 has a simple structure, and is relatively small and lightweight, inexpensive, highly reliable, excellent in quietness, and low in running cost and maintenance cost.

Note that in the rotating bending fatigue testing machine 200, it is desirable to conduct a test with displacement control for prevention of leakage of the electrolytic solution R when the test specimen 10 is broken and as a countermeasure against earthquake. In this case, it is desirable to conduct the test by monitoring with the load gauge 22 and adjusting the displacement amount using closed loop control.

The use of the hydrogen charging device 100 shown in FIG. 1 and FIG. 2 is not limited to the rotating bending fatigue testing machine 200 shown in FIG. 4 to FIG. 5, and therefore, it can be widely used in fatigue testing machines other than the rotating bending fatigue testing machine 200, for example, tension/compression fatigue testing machines, cyclic bending fatigue testing machines, cyclic torsion fatigue testing machines, combined bending/torsion fatigue testing machines and the like.

Next, based on FIG. 6 and FIG. 7, a hydrogen charging device 101 and a rotating bending fatigue testing machine 201 according to another embodiment will be described. Note that in components of the hydrogen charging device 101 and the rotating bending fatigue testing machine 201, portions common to those of the hydrogen charging device 100 and the rotating bending fatigue testing machine 200 are assigned with the same reference signs as the reference signs in FIG. 1 to FIG. 5 and explanation thereof is omitted.

Figure 6:
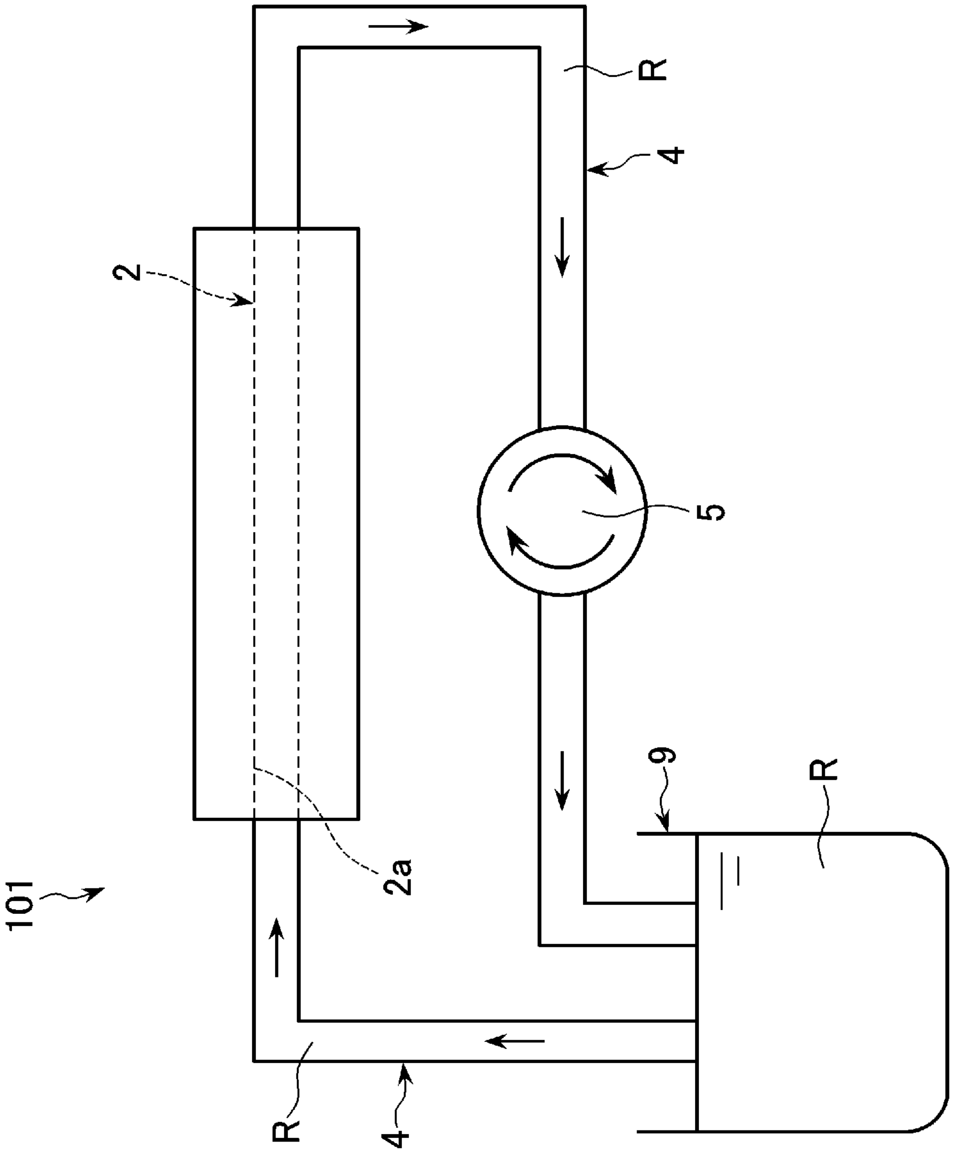
FIG. 6 is a view showing a schematic configuration of a hydrogen charging device according to another embodiment.

As shown in FIG. 6, the hydrogen charging device 101 includes a circulation path 4 and a liquid pump 5 that circulate and supply an electrolytic solution R into a through-hole 2 provided inside a test specimen 1. The circulation path 4 is formed of a flexible tube, and in the middle of the circulation path 4, a relay tank 9 that temporarily stores the electrolytic solution R circulating in the circulation path 4 by the liquid pump 5 is disposed. As the electrolytic solution R, an ammonium thiocyanate aqueous solution is used, but the electrolytic solution R is not limited to this.

In the hydrogen charging device 101 shown in FIG. 6, when the electrolytic solution R is circulated and supplied into the through-hole 2 of the test specimen 1 via the circulation path 4 by the liquid pump 5, hydrogen is generated by a chemical reaction, and hydrogen atoms H enter the test specimen 1 from an inner peripheral surface 2*a* of the through-hole 2, whereby the test specimen 1 is charged with hydrogen. A temperature and pH of the electrolytic solution R at this time can be controlled by control means (not illustrated).

The hydrogen charging device 101 performs hydrogen charge while circulating and supplying the electrolytic solution R into the through-hole 2 of the test specimen 1, and therefore can efficiently charge hydrogen into the test specimen 1. Further, since the hydrogen charging device 101 can be formed of the electrolytic solution R, the circulation path 4, the liquid pump 5 and the like, and does not require a high-pressure gas container, a high-pressure gas conveyance path or the like, the hydrogen charging device 101 is simple in structure and inexpensive.

Next, based on FIG. 7, the rotating bending fatigue testing machine 201 using the hydrogen charging device 101 shown in FIG. 6 will be described. FIG. 7 is a partially omitted vertical sectional view showing a main part of the rotating bending fatigue testing machine 201 and shows a region corresponding to a region shown in FIG. 5 in the aforementioned rotating bending fatigue testing machine 200 (see FIG. 4). Further, in FIG. 7, there are some portions where cross-hatching is not filled in order to ensure visibility of leader lines of the reference signs.

Figure 7:
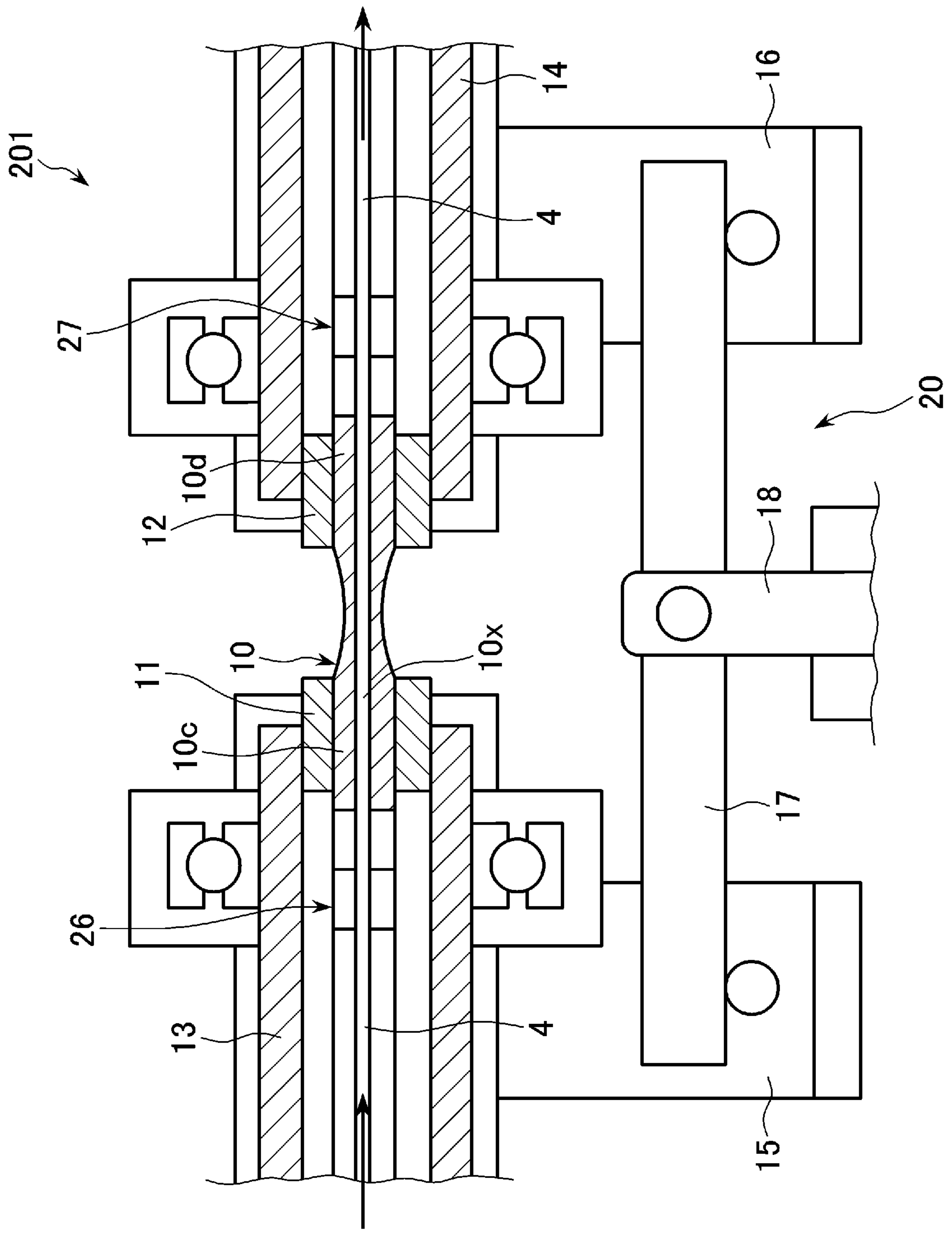
FIG. 7 is a partially omitted vertical sectional view showing a main part of a rotating bending fatigue test machine according to another embodiment.

The rotating bending fatigue testing machine 201 shown in FIG. 7 has a structure in which the anode material 3, the direct-current power source 6, the coated copper wire 7 and the brushes 6*a* and 6*b* are eliminated from the rotating bending fatigue testing machine 200 shown in FIG. 3 to FIG. 5, and the structures, functions and the like of the other portions are the same as those of the rotating bending fatigue testing machine 200.

In the rotating bending fatigue testing machine 201 shown in FIG. 7, it is possible to perform a rotating bending fatigue test of the test specimen 10 while efficiently charging hydrogen to the test specimen 10 by rotating the test specimen 10 by a motor 21 (see FIG. 4) in a state where a bending moment is applied to the test specimen 10 by a pulling-down mechanism 19 (see FIG. 4) while circulating and supplying the electrolytic solution R into the through-hole 10*x* of the test specimen 10 by operating the liquid pump 5.

By performing the rotating bending fatigue test of the test specimen 10 using the rotating bending fatigue testing machine 201, It is possible to appropriately evaluate hydrogen embrittlement properties of the material (test specimen 10) and rationally select the material usable in a hydrogen environment. The rotating bending fatigue testing machine 201 has a simple structure, is relatively small and lightweight, inexpensive and highly reliable, and is also excellent in quietness, and low in running cost and maintenance cost.

Note that the hydrogen charging devices 100 and 101 and the rotating bending fatigue testing machines 200 and 201 described based on FIG. 1 to FIG. 7 are illustrations of the hydrogen charging device and the rotating bending fatigue testing machine according to the present invention, and the hydrogen charging device and the rotating bending fatigue testing machine according to the present invention are not limited to the hydrogen charging devices 100 and 101 and the rotating bending fatigue testing machines 200 and 201 described above.

INDUSTRIAL APPLICABILITY

The present invention can be widely used in the industrial fields that require appropriate evaluation of hydrogen embrittlement properties of materials and rational selection of the materials usable in hydrogen environments.

REFERENCE SIGNS LIST

1, 10 test specimen
2, 10*x* through-hole
2*a*, 10*e* inner peripheral surface
2*d* inside diameter
3 anode material
3*d* outside diameter
4 circulation path
5 liquid pump
6 direct-current power source
6*a*, 6*b* brush
7 coated copper wire
8 non-conductive material
8*a* liquid passage hole
9 relay tank
10*a*, 10*b* end surface
10*c*, 10*d*, 13*c*, 14*c* end portion
11, 12 chuck
13, 14 tubular shaft member
15, 16 hanging member
17 horizontal connecting member
18 vertical connecting member
19 pulling-down mechanism
20 bending means
21 motor
22 load gauge
23, 24 pulley
25 belt
26, 27 rotary joint (rotating bearing)
100, 101 hydrogen charging device
200, 201 rotating bending fatigue testing machine
H hydrogen atom
$H_2$ hydrogen gas
$H^+$ hydrogen ion
$O_2$ oxygen gas
$O^{2-}$ oxygen ion

The invention claimed is:

1. A hydrogen charging device, comprising:

a circulation path and a liquid pump that circulate and supply an electrolytic solution into a through-hole provided inside a test specimen;

an anode material capable of being accommodated in the through-hole provided inside the test specimen, in a state of being separated from an inner peripheral surface of the through-hole; and a direct-current power source that applies a minus voltage to the test specimen, and a plus voltage to the anode material, wherein at least a part of the anode material has a spiral shape with an outside diameter smaller than an inside diameter of the through-hole.

2. The hydrogen charging device according to claim 1, wherein at least a part of an outer periphery of the part having the spiral shape of the anode material is coated with a non-conductive material having liquid permeability.

3. The hydrogen charging device according to claim 1, further comprising at least one of vibration applying means that applies vibration to the test specimen, or pulsation applying means that pulsates the electrolytic solution flowing in the through-hole.

4. A rotating bending fatigue testing machine, comprising:

a pair of tubular shaft members coaxially disposed to face each other to rotate a test specimen in a state of respectively gripping end portions of the test specimen having a through-hole opening on both end surfaces;

bending means that applies a bending moment to the test specimen;

driving means that rotates the test specimen in a state where a bending moment is applied by the bending means;

a liquid pump and a circulation path that circulate and supply an electrolytic solution from one of the tubular shaft members to another one of the tubular shaft members via the through-hole of the test specimen gripped by the tubular shaft members;

an anode material accommodated in the through-hole of the test specimen gripped by the tubular shaft members in a state of being separated from an inner peripheral surface of the through-hole; and a direct-current power source that applies a minus voltage to the test specimen, and a plus voltage to the anode material.

5. The rotating bending fatigue testing machine according to claim 4, wherein the circulation path placed in the tubular shaft members and the through-hole of the test specimen are caused to communicate with each other by a rotary joint.

6. The rotating bending fatigue testing machine according to claim 4, wherein electric power is supplied to each of the test specimen and the anode material from the direct-current power source via a brush.

* * * * *